Jan. 13, 1931.  L. C. BAYLES  1,788,972
CHUCK BUSHING FOR ROCK DRILLS
Filed April 11, 1928
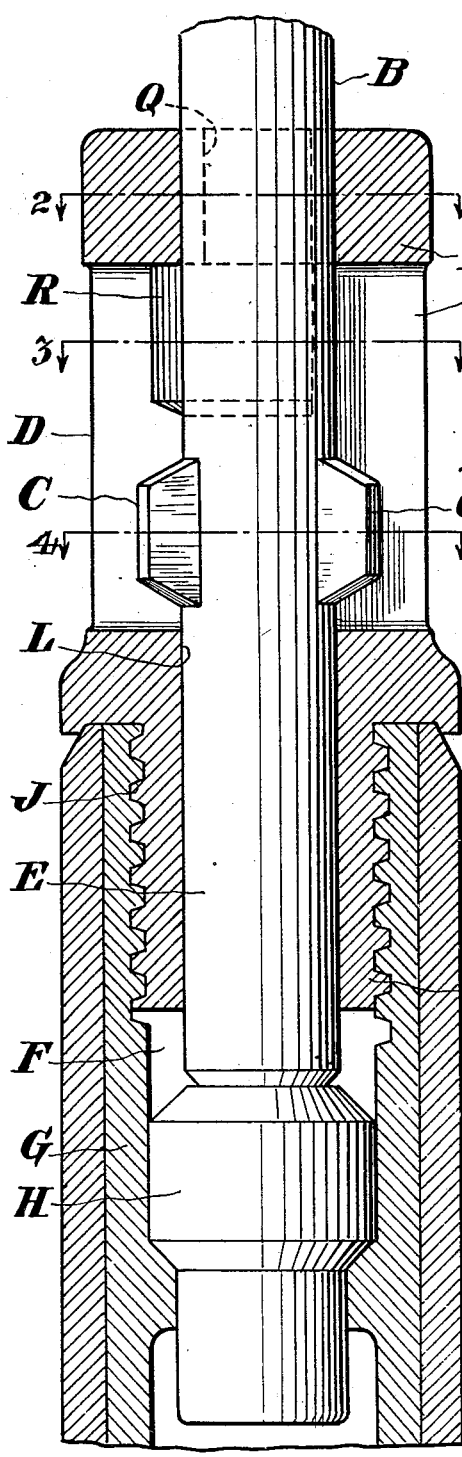
FIG.-1.
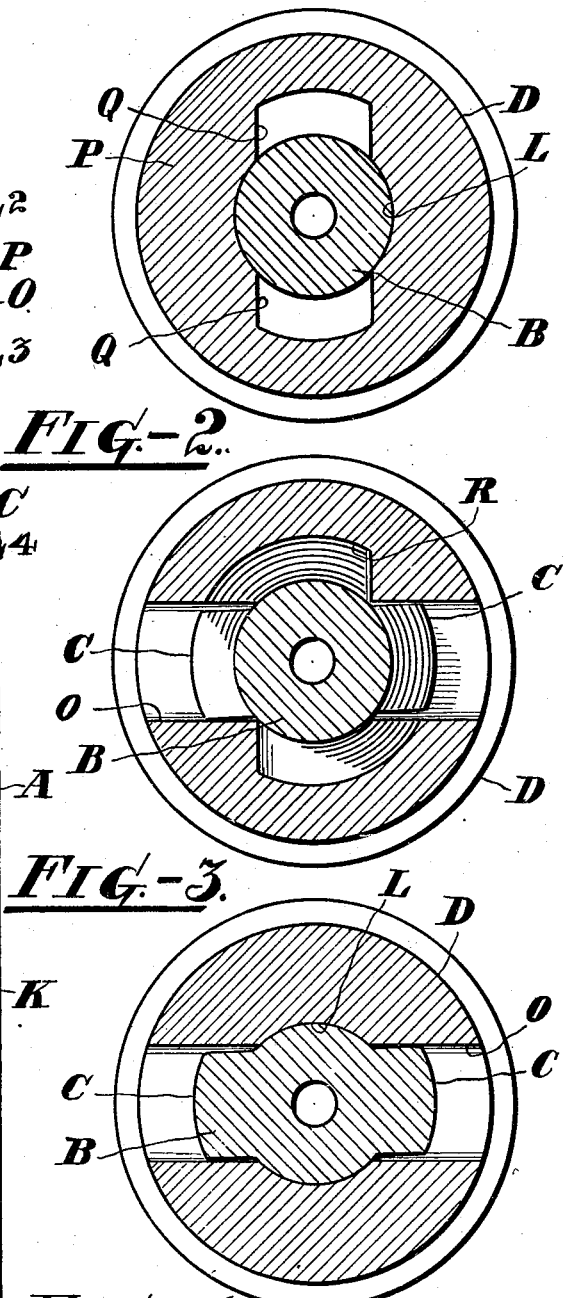
FIG.-2.
FIG.-3.
FIG.-4.
INVENTOR.
Lewis C. Bayles
BY
HIS ATTORNEY.

Patented Jan. 13, 1931

1,788,972

UNITED STATES PATENT OFFICE

LEWIS C. BAYLES, OF EASTON, PENNSYLVANIA, ASSIGNOR TO INGERSOLL-RAND COMPANY, OF JERSEY CITY, NEW JERSEY, A CORPORATION OF NEW JERSEY

CHUCK BUSHING FOR ROCK DRILLS

Application filed April 11, 1928. Serial No. 269,185.

This invention relates to rock drills, but more particularly to a chuck bushing adapted to be secured to a rock drill chuck and to extend forwardly of the rock drill for interlockingly supporting a working implement.

One object of the invention is to utilize the weight of the rock drill for retracting the working implement from the drill hole.

Other objects will be in part obvious and in part pointed out hereinafter.

In the drawings taken in conjunction with the following specification and in which similar reference characters refer to similar parts, Figure 1 is a sectional elevation of the front end of a rock drill having the invention applied thereto, Figure 2 is a transverse view taken through Figure 1 on the line 2—2 looking in the direction indicated by the arrows, and Figures 3 and 4 are similar views taken through Figure 1 on the lines 3—3 and 4—4 respectively looking in the direction indicated by the arrows.

Referring more particularly to the drawings, A designates a front head of a rock drill which may be of the stoper type in which the drill and the working implement, such as the drill steel B, are inverted for the purpose of drilling up-holes in the roof of a drift or tunnel. The drill steel B is of the type commonly referred to as the Leyner steel and accordingly has a pair of lugs C for interlockingly engaging an element into which it is inserted, such as a chuck bushing D.

The portion E of the drill steel B rearwardly of the lugs C may be termed the shank, and said shank in this instance extends into the bore F of a chuck G adapted to be rotated in the front head A and terminating with its front end in the same transverse plane as the front end of the front head.

Among other functions the chuck G serves as a seat for an anvil block H adapted to transmit the blows of a hammer piston (not shown) to the working implement B. The chuck G may be of a well known type having internal threads J in its front end to receive a correspondingly threaded extension K of the chuck bushing D. A bore L extending longitudinally through the chuck bushing D may be of any suitable conformation to accommodate the particular type of working implement which it is desired to use.

Formed transversely through the chuck bushing D is a recess O which conjoins with the bore L and is of a slightly greater width than the thickness of the lugs C which it is adapted to accommodate. At the front end of the recess O is a wall P which is an integral part of the chuck bushing D and acts as an abutment for the lugs C to prevent ejection of the working implement B from the chuck bushing D.

In order to enable the lugs C to enter the chuck D a slot Q is formed in the front end of the chuck bushing D and preferably perpendicularly with respect to the recess O. In the front end of the recess are formed cavities R which communicate at one end with the slot Q and with their other ends with the recess O to enable the working implement to be rotated so that the lugs C may be moved out of alignment with the slot Q and into alignment with the recess O wherewith said lugs are interlockingly engaged in the operative position of the drill steel.

The cavities R may be located well forwardly of the position which the lugs C occupy during the drilling operation so that it will be impossible for the drill steel to accidentally rotate into a position wherein it may be ejected from the chuck bushing D.

In inserting the drill steel B into the chuck bushing D said drill steel is so disposed that the lugs C will be in alignment with the slot Q. The drill steel may then be pushed rearwardly into the chuck bushing until the lugs C reach a point adjacent the cavities R. From this position the drill steel may be rotated a partial revolution until the lugs C are carried into alignment with the recess O, whereupon the drill steel may be moved rearwardly in the direction of the anvil block. In this manner the drill steel will be firmly locked to the rotatable chuck G so that the rotary movement of said chuck may be imparted to the drill steel to change its position for each succeeding stroke of the hammer piston.

As has been before intimated the present invention is more particularly adapted for use in connection with drills of the stoper type. These drills are used in inverted position and when equipped with chucks of the type heretofore in use it has not been possible to utilize the weight of the drill for retracting the working implement as the chuck bushing merely acts as a guide for the working implement without being in any way interlocked thereto. In consequence of this construction when the drill is retracted the working implement frequently remains in the hole and it is therefore necessary to remove the working implement by hand. In cases where thorough cleansing of the drill hole may be obtained or where drilling conditions are ideal this method of removing the working implement does not present very great difficulties. When drilling in difficult ground however, it frequently happens that the drill steel becomes stuck in the drill hole, an occurrence which usually occasions considerable delay in removing the drill steel. The present invention is particularly adapted to overcome the aforesaid objections. It enables the weight of the rock drill to be utilized for freeing the drill steel from the hole and thus effects a considerable saving in the matter of time.

I claim:

In a rock drill, the combination of a front head and a lugged working implement, a chuck rotatable in the front head and terminating at its front end in the same transverse plane as the front head, a chuck bushing extending forwardly of the front head and having an extension threaded into the chuck, said chuck bushing having a bore for the reception of the working implement, a recess transversely through the chuck bushing and adapted to non-rotatably engage the lugs of the working implement, a wall integral with the chuck bushing forming a closure for the front end of the recess and acting as an abutment for the lugs, a slot in the wall to enable the lugs to enter the chuck bushing, said slot being angularly disposed with respect to the recess, and cavities opening from the side walls of the recess at points adjacent the forward extremity of the recess and connecting said recess with the slot to permit of a partial revolution of the working implement for carrying the lugs into engagement with the recess, the rearwardmost portions of said cavities lying well forwardly of any position which the lugs will occupy during the normal operation of the rock drill, thus preventing accidental relative rotation of the drill steel in the chuck bushing.

In testimony whereof I have signed this specification.

LEWIS C. BAYLES.